United States Patent
Gurke et al.

(10) Patent No.: US 9,534,072 B2
(45) Date of Patent: Jan. 3, 2017

(54) POLYISOCYANATE-BASED ADHESIVE

(75) Inventors: Thorsten Gurke, Overijse (BE); Wesley Verbeke, Steenokkerzeel (BE)

(73) Assignee: Huntsman International LLC, The Woodlands, TX (US)

( * ) Notice: Subject to any disclaimer, the term of this patent is extended or adjusted under 35 U.S.C. 154(b) by 338 days.

(21) Appl. No.: 12/529,830

(22) PCT Filed: Mar. 13, 2008

(86) PCT No.: PCT/EP2008/053015
§ 371 (c)(1),
(2), (4) Date: Jan. 21, 2010

(87) PCT Pub. No.: WO2008/110602
PCT Pub. Date: Sep. 18, 2008

(65) Prior Publication Data
US 2010/0136346 A1    Jun. 3, 2010

(30) Foreign Application Priority Data

Mar. 15, 2007    (EP) .................................... 07104276

(51) Int. Cl.
| | | |
|---|---|---|
| *B32B 27/40* | (2006.01) |
| *C08L 75/04* | (2006.01) |
| *C08G 18/09* | (2006.01) |
| *C08G 18/12* | (2006.01) |
| *C08G 18/22* | (2006.01) |
| *C08G 18/42* | (2006.01) |
| *C08G 18/48* | (2006.01) |
| *C08G 18/76* | (2006.01) |
| *C09J 175/04* | (2006.01) |

(52) U.S. Cl.
CPC .............. *C08G 18/092* (2013.01); *C08G 18/12* (2013.01); *C08G 18/225* (2013.01); *C08G 18/42* (2013.01); *C08G 18/48* (2013.01); *C08G 18/7671* (2013.01); *C09J 175/04* (2013.01); *Y10T 428/31551* (2015.04)

(58) Field of Classification Search
CPC ..... C08G 18/092; C08G 18/12; C08G 18/225; C08G 18/42; C08G 18/48; C08G 18/7671; C09J 175/04; Y10T 428/31551

USPC ........................................................ 428/423.1
See application file for complete search history.

(56) References Cited

U.S. PATENT DOCUMENTS

| | | | | |
|---|---|---|---|---|
| 3,817,939 | A * | 6/1974 | Allen et al. ...................... | 528/52 |
| 4,126,741 | A * | 11/1978 | Carleton et al. ................. | 528/57 |
| 4,299,924 | A * | 11/1981 | Nomura ................ | C08G 18/092 |
| | | | | 521/131 |
| 4,933,416 | A * | 6/1990 | Gillis ..................... | C08G 18/10 |
| | | | | 528/74.5 |
| 5,159,048 | A * | 10/1992 | Cassidy et al. ................. | 528/53 |
| 5,175,228 | A * | 12/1992 | Wang et al. .................... | 528/48 |
| 5,322,914 | A | 6/1994 | McInnis et al. | |
| 5,340,901 | A | 8/1994 | Wang | |
| 5,354,609 | A | 10/1994 | Wang | |
| 5,508,111 | A * | 4/1996 | Schmucker ................ | 428/423.1 |
| 6,072,019 | A * | 6/2000 | Sengupta ........................ | 528/59 |
| 6,596,819 | B2 | 7/2003 | Morikawa et al. | |
| 6,635,711 | B1 | 10/2003 | Miskovic et al. | |
| 7,641,968 | B2 * | 1/2010 | Kanagawa et al. ....... | 428/355 N |
| 8,168,260 | B2 * | 5/2012 | Limerkens et al. ....... | 427/385.5 |
| 2002/0091222 | A1 | 7/2002 | Viegas et al. | |
| 2004/0132953 | A1 | 7/2004 | Fieldhouse et al. | |
| 2006/0051595 | A1 | 3/2006 | Gaudeus et al. | |
| 2006/0084777 | A1 | 4/2006 | Bleys et al. | |
| 2008/0113185 | A1* | 5/2008 | Haas ....................... | C08G 18/10 |
| | | | | 428/332 |

FOREIGN PATENT DOCUMENTS

| | | |
|---|---|---|
| EP | 0380178 | 8/1990 |
| JP | 57/131275 | 8/1982 |
| JP | 59/100179 | 6/1984 |
| JP | 60/090281 | 5/1985 |
| JP | 02/042068 | 2/1990 |
| JP | 2002/294201 | 10/2002 |

* cited by examiner

*Primary Examiner* — Thao T Tran
(74) *Attorney, Agent, or Firm* — Huntsman International LLC

(57) ABSTRACT

Adhesive prepared by reacting an organic polyisocyanate with a compound containing isocyanate-reactive hydrogen atoms in the presence of a trimerization catalyst. The soft-block content of the adhesive is between 20 and 70 wt %.

7 Claims, No Drawings

POLYISOCYANATE-BASED ADHESIVE

CROSS REFERENCE TO RELATED APPLICATIONS

This application is the National Phase of International Application PCT/EP2008/053015 filed Mar. 13, 2008 which designated the U.S. and which claims priority to European (EP) Pat. App. No. 07104276.6 filed Mar. 15, 2007. The noted applications are incorporated herein by reference.

The present invention relates to adhesive compositions and adhesives based on polyisocyanate, to polyisocyanate-based adhesive formulations and to reactive mixtures for preparing such adhesives.

Adhesives based on compounds containing more than one isocyanate group per molecule and on compounds containing more than one hydroxyl group per molecule, so-called polyurethane adhesives or polyisocyanate-based adhesives, are used in many application areas due to their outstanding properties, their simple and economical processing and their high strength. One of these application areas is flexible packaging were a laminated film or sheet, produced using an adhesive, is used.

However for some applications the crosslink density of standard polyurethane adhesives is too low, preventing the material to be used in severe climatically conditions. For example car body adhesives should have high heat and salt water resistance.

For other applications, such as flexible food packaging, the cure rate of polyurethane adhesives is very slow, requiring prolonged storage of the final laminate so as to reduce the amount of migratable aromatic amines below the legally required limit.

For adhesives in general, a good and permanent bond to the substrate or substrates to which it is provided, is sought. Adhesives applied may fail according to at least two failure modes. According to a first failure mode, the adhesion between the adhesive and the substrate surface to which the adhesive adheres, is broken. This failure mode is also referred to as "adhesive failure" or "adhesion failure". According to a second failure mode, the adhesive itself is broken under stress provided to the adhesive, e.g. by mutually displacing the two substrate surfaces which are held together by the adhesive. This failure mode is also referred to as "cohesion failure". For both cohesion and adhesion failure, the maximum stress, which the adhesive can resist, is indicative for the strength of the bond provided by the adhesive. The higher the maximum stress the adhesive can resist, the stronger the bond and the better cohesion or adhesion failure can be avoided.

It is an object of the invention to provide a strong adhesive, suitable to resist to an increased maximum stresses. It is a further object of the present invention to provide an adhesive or adhesive composition based on polyisocyanates experiencing one or more of the disadvantages mentioned above to a less extent, or even not experiencing one or more of the disadvantages mentioned above.

Some adhesives according to embodiments of the present invention provide bonds suitable to be used in more severe climatically conditions, such as at elevated temperature or in salty conditions, e.g. car body adhesives subjected to high heat and/or salt water.

Some adhesives according to embodiments of the present invention provide bonds suitable to be used in flexible food packaging, due to a reduced migration of aromatic amines, i.e. a migration rate below the legally required limit.

According to a first aspect of the present invention, a polyisocyanate based adhesive is provided, which adhesive is prepared by reacting an organic polyisocyanate with a compound containing isocyanate-reactive hydrogen atoms in the presence of a trimerisation catalyst.

The presence of a trimerisation catalyst has the effect that the polyisocyanate-based adhesive according to the present invention can become a polyisocyanurate-based adhesive.

Some embodiments of the polyisocyanate-based adhesives according to the present invention have the benefit of extremely fast cure and therefore fast handling strength. Furthermore, some embodiments of the polyisocyanate-based adhesives according to the present invention have an extremely high crosslink density (compared to presently known polyurethane-based adhesives), which increases the strength of the bond as well as the resistance against unfavourable media and creep. The increased strength also results in a higher maximum stress the adhesive can resist before cohesion or adhesion failure occurs. Some embodiments of the polyisocyanate-based adhesives according to the present invention achieve a faster reduction of presence and/or migration of aromatic amine in the cured film, which is extremely valuable when the adhesive is used in food and medical related applications.

Organic polyisocyanates may be aromatic or aliphatic organic polyisocyanates.

The organic polyisocyanate used in the present invention may comprise any number of polyisocyanates, including but not limited to, toluene diisocyanates (TDI), diphenylmethane diisocyanate (MDI)-type isocyanates, and prepolymers of these isocyanates. Preferably the polyisocyanate may have at least two aromatic rings in its structure, and is a liquid product. Polymeric isocyanates having a functionality greater than 2 are preferred.

The functionality of an organic polyisocyanate, as such or as polymeric or prepolymeric polyisocyanates, refers to the average number of isocyanate groups per molecule, averaged over a statistically relevant number of molecules present in the organic polyisocyanate.

In case diphenylmethane diisocyanate (also known as methylene diphenyl diisocyanate, and referred to as MDI) is used to provide an adhesive according to the present invention, the diphenylmethane diisocyanate (MDI) used in the present invention can be in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, or any of their derivatives having a urethane, isocyanurate, allophonate, biuret, uretonimine, uretdione and/or iminooxadiazinedione groups and mixtures of the same.

Examples of other suitable organic polyisocyanates are tolylene diisocyanate (also known as toluene diisocyanate, and referred to as TDI), such as 2,4 TDI and 2,6 TDI in any suitable isomer mixture, hexamethylene diisocyanate (HMDI or HDI), isophorone diisocyanate butylene diisocyanate, trimethylhexamethylene diisocyanate, di(isocyanatocyclohexyl)methane, e.g. 4,4'-diisocyanatodicyclohexylmethane ($H_{12}MDI$), isocyanatomethyl-1,8-octane diisocyanate and tetramethylxylene diisocyanate (TMXDI), 1,5-naphtalenediisocyanate (NDI), p-phenylenediisocyanate (PPDI), 1,4-cyclohexanediisocyanate (CDI), tolidine diisocyanate (TODI), any suitable mixture of these organic polyisocyanates, and any suitable mixture of one or more of these organic polyisocyanates with MDI in the form of its 2,4'-, 2,2'- and 4,4'-isomers and mixtures thereof, the mixtures of diphenylmethane diisocyanates (MDI) and oligomers thereof.

Preferred organic polyisocyanates used for the present invention are polymeric or prepolymeric organic polyisocyanates, such a quasi-prepolymers, semi-prepolymers or full prepolymers, which may be obtained by reacting polyisocyanates, e.g. organic polyisocyanates as set out above, and preferably MDI-based organic polyisocyanates, with compounds containing isocyanate-reactive hydrogen atoms. Polymeric organic polyisocyanates are to be understood as polyisocyanate compounds having an isocyanate value less than 6.5%. Full Prepolymers based on organic polyisocyanates are to be understood as polyisocyanate compounds having an isocyanade value ranging between 6.5% and 12%. Semi-prepolymers are to be understood as polyisocyanate compounds having an isocyanade value ranging between 12 and 22%. Quasi-prepolymers are to be understood as polyisocyanate compounds having an isocyanate value ranging between 22 and 28%. It is understood that also other polyisocyanates, having isocyanate values more than 28% can be used. The isocyanate content, isocyanate value or NCO-value, mean the ratio, expressed in percentages, of the molar mass of the isocyanate groups in the isocyanate or polyisocyanate component over the total molar mass of the isocyanate or polyisocyanate component.

Examples of compounds containing isocyanate-reactive hydrogen atoms suitable to provide applicable polymeric or prepolymeric polyisocyanates include alcohols, glycols or even relatively high molecular weight polyether polyols and polyester polyols, mercaptans, carboxylic acids such as polybasic acids, amines, urea and amides. Particularly suitable polymeric or prepolymeric polyisocyanates are reaction products of polyisocyanates with monohydric or polyhydric alcohols.

The polymeric or prepolymeric polyisocyanates are prepared by conventional methods, e.g. by reacting polyhydroxyl compounds which have a molecular weight of from 400 to 5000, in particular mono- or polyhydroxyl polyethers, optionally mixed with polyhydric alcohols which have a molecular weight below 400, with excess quantities of polyisocyanates, for example aliphatic, cycloaliphatic, araliphatic, aromatic or heterocyclic polyisocyanates.

Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether polyols obtained by ring-opening copolymerisation of alkylene oxides, such as ethylene oxide and/or propylene oxide, with isocyanate-reactive initiators of functionality 2 to 8. The functionality of the isocyanate-reactive initiators is to be understood as the number of isocyanate-reactive hydrogen atoms per molecule initiator. Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebacic acid, and the like can be given.

Preferred polyols to be used in the polymeric or prepolymeric polyisocyanates are polyols which improves the miscibility of the polyol with the organic polyisocyanate, e.g. by using polyols comprising a high ethyleneoxyde content. The term miscibility is to be understood as being able to mix without separation into two or more phases. It is understood that components are to be miscible within the applicable ratio.

In a particularly preferred embodiment of the invention, polymeric or prepolymeric polyisocyanates may be used as polyisocyanate component having an average functionality of 2 to 2.9, preferably 2.0 to 2.5, a maximum viscosity of 6000 mPa s, and an isocyanate content (or NCO-value) of 6 to 30 wt %, preferably 10 to 26 wt %. The viscosity is measured using a Brookfield viscosity meter (model DVII) with spindle 21 at a temperature of 25 degrees C.

The second component in the present adhesive formulation is an isocyanate-reactive compound. As an example, any of the above mentioned compounds containing isocyanate-reactive hydrogen atoms suitable to provide applicable prepolymers can be used.

The best adhesive performance is obtained when both components, the polyisocyanate and the isocyanate-reactive compound, are easily miscible with each other. In this respect good miscibility means a clear solution after good mixing. Again, the term miscibility is to be understood as being able to mix without separation into two or more phases. It is understood that components are to be miscible within the applicable ratio.

According to the present invention, at least one of the compound containing isocyanate-reactive hydrogen atoms and the organic polyisocyanate, comprises at least one, and optionally more than one, softblocks. It has been observed that the softblock content of the adhesive has an influence on the adhesive performance. Polyisocyanate based adhesives according to the present invention may have a softblock content between 20 and 70% by weight, more preferably between 40 and 60 wt %. It was found that adhesives according to the present invention having a softblock content in the range of 20% to 70%, in particular in the range of 40% to 60%, may show a reduces aromatic amine release.

Softblock content is defined as the wt % of isocyanate-reactive compounds present as such and/or if applicable present in the prepolymer, that have a molecular weight (also referred to as MW) above 500. The weight percent is expressed relative to the weight of the whole formulation of the adhesive.

Hence either a prepolymer may be used which has itself a softblok content, e.g. a fairly high softblock content and/or an amount, e.g. a high amount of an isocyanate-reactive compound having a MW larger than 500 may be used.

The softblocks may thus be provided by the compound containing isocyanate-reactive hydrogen atoms, and/or if applicable, compounds containing isocyanate-reactive hydrogen atoms used to provide the polyisocyanate prepolymers, in case the organic polyisocyanate is a polyisocyanate prepolymer.

The softblocks may be provided completely by the compound containing isocyanate-reactive hydrogen atoms being a component of the adhesive formulation. The softblocks may be provided completely by the compounds containing isocyanate-reactive hydrogen atoms used to provide the polyisocyanate prepolymers. The softblocks may be provided partially by the compound containing isocyanate-reactive hydrogen atoms being component of the adhesive formulation, and partially by the compounds containing isocyanate-reactive hydrogen atoms used to provide the polyisocyanate prepolymers. Preferably, at least 50% of the softblock content, this is at least half of the total mass provided by the soft block content, is provided by the component of the adhesive formulation, which component provides the isocyanate-reactive hydrogen atoms to the adhesive formulation.

The third component of the present adhesive formulation is a catalyst that promotes the trimerisation of isocyanates of the organic polyisocyanate being part of the adhesive.

As trimerisation catalyst all of such known catalysts as tetraalkylammonium hydroxides (e.g. tetramethylammonium hydroxide, tetraethylammonium hydroxide and tetrabutylammonium hydroxide), organic weak acid salts (e.g. tetramethylammonium acetate, tetraethylammonium acetate and tetrabutylammonium acetate), trialkylhydroxyalkylammonium hydroxides (e.g. trimethylhydroxypropylammonium hydroxide, trimethylhydroxyethylammonium hydroxide, triethylhydroxypropylammonium hydroxide and triethylhydroxyethylammonium hydroxide), organic weak acid salts (e.g. trimethylhydroxypropylammonium acetate, trimethylhydroxyethylammonium acetate, triethylhydroxypropylammonium acetate and triethylhydroxyethylammonium acetate), tertiary amines (e.g. triethylamine, triethylenediamine, 1,5-diaza-bicyclo[4.3.0]nonene-5,1,8-diazabicyclo[5.4.0]-undecene-7 and 2,4,6-tris(dimethylaminomethyl)phenol), metal salts of alkylcarboxylic acids (e.g. acetic acid, caproic acid, caprylic acid, octyl acid, myristic acid and naphthenic acid), and the like, and combinations of two or more of such catalysts may be used.

According to preferred embodiments of the present invention, a trimerisation catalyst or catalysts from the group of alkali metal salts of carboxylic acids, such as potassium acetate or potassium 2-ethylhexanoate, may be selected.

The amount of the trimerisation catalyst used may be in the range of e.g. 0.01% wt to 0.1% wt, preferably between 0.02 and 1 wt % based on the whole formulation, more preferably between 0.02 and 0.50 wt %, such as in the range of 0.1 to 0.2 wt %.

Preferably the catalyst may be dissolved in the isocyanate-reactive compound to achieve storage stability.

The compositions of adhesives according to the present invention may include other optional components such as additives typically used in adhesive compositions, e.g., wetting agents, dispersing aids, thickeners, surfactants, pigments, mineral fillers, adhesion promotors (such as compounds containing silanyl groups), defoaming agents and antimicrobial agents.

According to a second aspect of the present invention, a reaction mixture for preparing a polyisocyanate based adhesive is provided. The reaction mixture comprises an organic polyisocyanate, a compound containing isocyanate-reactive hydrogen atoms and a trimerisation catalyst.

A reaction mixture according to the second aspect of the present invention may be suitable to provide an adhesive according to the first aspect of the present invention.

The elements of the reaction mixture, i.e. the organic polyisocyanates, the compounds containing isocyanate-reactive hydrogen atoms and the trimerisation catalysts may be similar, even identical, as corresponding elements set out for the polyisocyanate based adhesive according to the first aspect of the present invention.

A reaction mixture according to the present invention may have a softblock content between 20 and 70% by weight, more preferably between 40 and 60 wt %.

Softblock content is defined as the wt % of isocyanate-reactive compounds present as such and if applicable present in the prepolymer, that have a molecular weight (also referred to as MW) above 500. The weight percent is expressed relative to the weight of the whole formulation of the reaction mixture.

Hence either a prepolymer may be used which has itself a softblock content, e.g. a fairly high softblock content and/or an amount, e.g. a high amount of an isocyanate-reactive compound having a MW larger than 500 may be used.

The softblocks may thus be provided by the compound containing isocyanate-reactive hydrogen atoms, and/or if applicable, compounds containing isocyanate-reactive hydrogen atoms used to provide the polyisocyanate prepolymers, in case the organic polyisocyanate is a polyisocyanate prepolymer.

The softblocks may be provided completely by the compound containing isocyanate-reactive hydrogen atoms being a component of the reaction mixture. The softblocks may be provided completely by the compounds containing isocyanate-reactive hydrogen atoms used to provide the polyisocyanate prepolymers. The softblocks may be provided partially by the compound containing isocyanate-reactive hydrogen atoms being component of the reaction mixture, and partially by the compounds containing isocyanate-reactive hydrogen atoms used to provide the polyisocyanate prepolymers. Preferably, at least 50% of the softblock content, this is at least half of the total mass provided by the soft block content, is provided by the component of the reaction mixture, which component provides the isocyanate-reactive hydrogen atoms to the reaction mixture.

According to a third aspect of the present invention, the polyisocyanate based adhesive according to the first aspect of the present invention is used to produce a structural adhesive.

According to a fourth aspect of the present invention, the polyisocyanate based adhesive according to the first aspect of the present invention is used to produce a laminated film.

The organic polyisocyanate, the isocyanate-reactive compound, i.e. compounds containing isocyanate-reactive hydrogen atoms, and the trimerisation catalyst are compounded and the reaction mixture is used to provide an adhesive, e.g. an adhesive layer of a laminated structure comprising a supporting structure, a second substrate layer and an adhesive layer binding the supporting layer to the second substrate layer. The provision of the adhesive layer can be provided, by, for example, coating the reaction mixture on a supporting structure, e.g. a film.

As an applicator of an adhesive according to the present invention there can be mentioned known applicators such as airless spray machine, air spray machine, immersion, roll coater, brush and the like.

The conditions used for curing an adhesive layer, after coating the reaction mixture on a supporting structure, e.g. a film and providing a second substrate layer during the lamination using an adhesive according to the invention, are preferably 20 to 150° C., particularly preferred 60 to 100° C. In producing a laminated structure, e.g. a laminated film, by using the present adhesive, the film used as supporting structure and/or second substrate layer, is not critical. As the film, there can be mentioned a film of polyester type such as polyethylene terephthalate or the like; a film of polyolefin type such as polyethylene, polypropylene or the like; a film of polyamide type such as nylon or the like; a metal foil such as aluminum foil, copper foil or the like; an ethylene-vinyl acetate copolymer or a saponification product thereof; a cellophane; a polyvinyl chloride; a polyvinylidene chloride; a polystyrene; a paper; and so forth. There can also be suitably used stretched products thereof and surface-treated (e.g. corona discharge-treated or surface-coated) products thereof.

The adhesive of the present invention can be suitably used for lamination not only between two film layers but also between three or more film layers.

The various aspects of this invention are illustrated, but not limited, by the following examples.

In these examples the following ingredients were used:

As organic polyisocyanate component:

SUPRASEC 1004: MDI variant of NCO value 32.8%, available from Huntsman Polyurethanes (softblock content 0.6%);

SUPRASEC 1007: prepolymer of NCO value 6.8%, based on MDI and a polyether polyol of MW 6000, available from Huntsman Polyurethanes (softblock content 75.1%);

SUPRASEC 1306: 4,4-MDI, available from Huntsman Polyurethanes (softblock content 0%);

SUPRASEC 1412: prepolymer of NCO value 19%, based on MDI and a polyester polyol of MW 2000, available from Huntsman Polyurethanes (softblock content 37.0%);

SUPRASEC 2004: MDI variant of NCO value 32.8%, available from Huntsman Polyurethanes (softblock content 0.6%);

SUPRASEC 2008: prepolymer of NCO value 10.2%, based on MDI and a polyether polyol of MW 4000, available from Huntsman Polyurethanes (softblock content 65.47%);

SUPRASEC 2020: MDI variant of NCO value 29.6%, available from Huntsman Polyurethanes (softblock content 0%);

SUPRASEC 2024: prepolymer of NCO value 23%, based on MDI and a polyether polyol of MW 125, available from Huntsman Polyurethanes (softblock content 0%);

SUPRASEC 2026: prepolymer of NCO value 21.4%, based on MDI mixture and a polyether polyol mixture, available from Huntsman Polyurethanes (softblock content 22.3%);

SUPRASEC 2029: prepolymer of NCO value 24.5%, based on MDI and a polyether polyol of MW 125, available from Huntsman Polyurethanes (softblock content 0%);

SUPRASEC 2045: prepolymer of NCO value 16%, based on MDI and polyether polyols of MW 125 and 2000, available from Huntsman Polyurethanes (softblock content about 42.53%);

SUPRASEC 2054: prepolymer of NCO value 15%, based on MDI and a polyether polyol of MW 2000, available from Huntsman Polyurethanes (softblock content 48.7%);

SUPRASEC 2058: prepolymer of NCO value 15.4%, based on MDI and a polyether polyol of MW 2000, available from Huntsman Polyurethanes (softblock content 47.9%);

SUPRASEC 2060: prepolymer of NCO value 16%, based on MDI and a polyether polyol of MW 2000, available from Huntsman Polyurethanes (softblock content 44.3%);

SUPRASEC 2067: prepolymer of NCO value 19.3%, based on MDI and a polyether polyol of MW 2000, available from Huntsman Polyurethanes (softblock content 35.9%).

SUPRASEC 2344: prepolymer of NCO value 15.5%, based on MDI and polyether polyols of MW 2000 and 2400, available from Huntsman Polyurethanes (softblock content 48%);

SUPRASEC 2405: prepolymer of NCO value 28.8%, based on MDI and a polyether polyol of MW 750, available from Huntsman Polyurethanes (softblock content 3%);

SUPRASEC 2496: MDI variant of NCO value 31.3%, available from Huntsman Polyurethanes (softblock content 0%);

SUPRASEC 2642: MDI variant of NCO of NCO value 32.7%, available from Huntsman Polyurethanes (softblock content 0%);

SUPRASEC 3030: a mixture of 70 wt % 4,4-MDI and 30 wt % 2,4-MDI, available from Huntsman Polyurethanes (softblock content 0%);

SUPRASEC 3050: a mixture of 50 wt % 4,4-MDI and 50 wt % 2,4-MDI, available from Huntsman Polyurethanes (softblock content 0%);

SUPRASEC 4102: MDI variant of NCO value 29.6%, available from Huntsman Polyurethanes (softblock content 0%);

Examples of components containing isocyanate-reactive hydrogen atoms are:

DALTOCEL F444: polyether polyol of MW 4360, available from Huntsman Polyurethanes;

DALTOCEL F456: polyether polyol of MW 2000, available from Huntsman Polyurethanes;

DALTOCEL F526: polyether polyol of MW 1300, available from Huntsman Polyurethanes;

DALTOLAC R 251: polyether polyol of MW 673, available from Huntsman Polyurethanes;

DALTOREZ P775: polyester polyol of MW 2500, available from Huntsman Polyurethanes;

Poly BD 45 HTLO: polybutadieen polyol of MW 2800, available from Sartomer;

An example of a suitable trimerisation catalyst is Catalyst LB, i.e. a metal salt trimerisation catalyst available from Huntsman Polyurethanes Potassium hydroxide is also an example of a trimerisation catalyst.

SUPRASEC, DALTOLAC, DALTOREZ and DALTOCEL are trademarks of Huntsman International LLC.

EXAMPLE 1

In this example the influence of the miscibility of the system on adhesive strength was tested.

In one trial SUPRASEC 2029 was cured with the different polyols indicated in Table 1 below in a weight ratio 50:50 in the presence of Catalyst LB in an amount of 0.2 wt %.

The maximum stress (in MPa) was determined according to standard EN 204-205.

The miscibility was determined by visual inspection and rated as shown in table 1, wherein "+" indicating a clear solution after good mixing and "−" indicating a non-clear solution after good mixing.

TABLE 1

| Polyol | Miscibility | Max Stress |
| --- | --- | --- |
| DALTOCEL F444 | + | 9.8 |
| DALTOCEL F456 | + | 8 |
| Poly BD 45 HTLO | − | 6.8 |
| DALTOREZ P775 | − | 1.7 |

In a similar trial SUPRASEC 2024 was used instead of SUPRASEC 2029. Results (with identical meaning as applicable for table 1) are indicated in Table 2.

TABLE 2

| Polyol | Miscibility | Max Stress |
| --- | --- | --- |
| DALTOCEL F444 | − | 0.3 |
| DALTOCEL F456 | + | 10 |

TABLE 2-continued

| Polyol | Miscibility | Max Stress |
|---|---|---|
| Poly BD 45 HTLO | − | 4.6 |
| DALTOREZ P775 | + | 8.5 |

Both these tests show that the miscibility has a significant impact on the performance of the system as an adhesive.

Example 2

This example is to provide information on the influence of the softblock content on the adhesion properties.

A screening of several commercially available polyisocyanates from Huntsman in combination with DALTOCEL F444 in a weight ratio of 19:1 was done (100 pbw of polyisocyanate and 5 pbw of polyol).

The two components were mixed in the presence Catalyst LB in an amount of 0.2 wt %, and applied as an adhesive for a steel/steel joint of 80μ thickness which was afterwards cured in an oven at 80° C. for 1 hour. After cooling and conditioning to normal climate conditions the adhesion properties were measured according to standard EN 204-205. Cohesion Failure (CF) means that the cohesive strength, i.e. the strength of the adhesive layer itself, is less than the interfacial strength between adhesive and the substrate, in this particular case the steel surface, at the interface between adhesive and substrate. The adhesive layer will break, leaving adhesive at the two surfaces of the two substrates to which the adhesive is to adhere. Adhesion failure (AF) means that that the cohesive strength, i.e. the strength of the adhesive layer itself, is larger than the interfacial strength between adhesive and the substrate, in this particular case the steel surface, at the interface between adhesive and substrate. The bond at one of the surfaces of the substrate between substrate surface and adhesive will break, leaving adhesive at only one of the surfaces of the two substrates to which the adhesive is to adhere. AF and CF are terms for evaluation, during the adhesion measurement of the specimen.

Results are presented in Table 3. The softblock content of the formulation is also indicated.

TABLE 3

| Polyisocyanate | Softblock (wt %) | Max Stress (MPa) | Failure |
|---|---|---|---|
| SUPRASEC 2020 | 4.8 | 1.4 | AF |
| SUPRASEC 2496 | 4.8 | 1.7 | CF |
| SUPRASEC 2642 | 4.8 | 1.6 | CF |
| SUPRASEC 3050 | 4.8 | 1.2 | CF |
| SUPRASEC 4102 | 4.9 | 1.6 | AF |
| SUPRASEC 1004 | 5.3 | 1.5 | CF |
| SUPRASEC 2004 | 5.3 | 1.5 | CF |
| SUPRASEC 2405 | 7.6 | 1.4 | CF |
| SUPRASEC 2024 | 14.8 | 1.8 | AF |
| SUPRASEC 2026 | 27.3 | 4.6 | AF |
| SUPRASEC 1412 | 40.4 | 11.6 | AF |
| SUPRASEC 2060 | 47 | 11 | CF |
| SUPRASEC 2058 | 50.4 | 10.6 | CF |
| SUPRASEC 2344 | 50.5 | 10 | AF |
| SUPRASEC 2054 | 51.1 | 10.2 | CF |
| SUPRASEC 2008 | 67.1 | 4.1 | AF |
| SUPRASEC 1007 | 76.3 | 1.2 | AF |

Increased Max Stress is noticed for soft block content in the range to 20 wt % to 70 wt %, with an optimum in the range 40 to 60 wt % softblock content.

Example 3

Also here the influence of softblock content on adhesive strength was tested by adding various amounts of DALTOCEL F444 to SUPRASEC 2029 in the presence of Catalyst LB in an amount of 0.2 wt % (over total weight of the adhesive formulation). The ratio isocyanate/polyol in table 4 means a weight ratio of 'x' parts by weight of SUPRASEC 2029 over 'y' parts by weight of DALTOCEL F444.

TABLE 4

| Ratio isocyanate/polyol | Softblock (wt %) | Max Stress (MPa) | Failure |
|---|---|---|---|
| 19/1 | 9.7 | 3.4 | AF |
| 3/1 | 28.7 | 4.1 | AF |
| 1/1 | 52.6 | 10.3 | CF |
| 0.5/1 | 68.4 | 2.7 | AF |

It is clear that the softblock content influences the maximum stress the adhesive can resist before failure. Preferred softblock contents are in the range of 20% to 70%, more preferred in the range of 40% to 60%.

Example 4

In this example the improvement in curing rate between the polyisocyanate-based adhesive system, being a polyisocyanurate-based adhesive systems, according to the present invention and the polyurethane-based adhesives of the prior art is shown.

SUPRASEC 1306, SUPRASEC 3030 and SUPRASEC 3050 were each reacted with polypropylene glycol of MW 2000 (PPG2000) to obtain polyisocyanate prepolymers with an NCO value of 16 wt %. In Table 5, second and third column, the ratio of the two components are given, which are reacted to provide the prepolymers. SUPRASEC 2045 and SUPRASEC 2344 are also polyisocyanate prepolymers. Those prepolymers were cured with castor oil (prepolymer/castor oil ratio 105:100) for 10 days at norm climate providing a film. Afterwards the obtained films were stored for 10 days at 50° C. in an acid solution (3% acetic acid in a water solution). The solution was submitted to analytical analysis for determination of the remaining aromatic amines (DADPM).

The results are given in Table 6, (wherein "S" refers to SUPRASEC).

TABLE 5

| Prepolymer: components | wt % softblock in prepolymer | wt % Free diisocyanate (MDI) in prepolymer | Remaining DADPM (ppb) |
|---|---|---|---|
| S 1306 + PPG 2000 | 58.2 | 41.8 | 7 |
| S 3030 + PPG 2000 | 58.2 | 41.8 | 23 |
| S 2045 | 42.5 | 41.8 | 26 |
| S 3050 + PPG 2000 | 58.2 | 41.8 | 16 |
| S 2344 | 48.0 | 39.5 | 10 |

These results show that only some of the standard polyurethane-based adhesives fulfill the legal requirement of a maximum migration of 20 ppb of aromatic amines even after 10 days of cure. The system based on SUPRASEC 2344 meets the legal requirements but a minimum of 10 days storage is needed; the measurement after 7 days storage yielded 72 ppb aromatic amines.

In comparison, polyisocyanurate-based adhesives according to the present invention were evaluated for their decay in emission of aromatic amines. SUPRASEC 1412 and SUPRASEC 2344 were used respectively as the polyisocyanate and both cured with DALTOLAC R 251 and DALTOCEL F526 (DALTOLAC R 251 and DALTOCEL F526 used in a weight ratio 4/1). The weight ratio suprasec 2344 to the combined weight of DALTOCEL F526 and DALTOLAC is equal to 4/1). Daltocel F 526 includes 0.01% potassium hydroxide. The castings were cured for 30 minutes at 80° C., cooled down to room temperature and within 4 hours stored for 10 days at 50° C. in the test solution mentioned above. Afterwards the amount of aromatic amines was determined in the solution.

For the system based on SUPRASEC 1412 the result was 13.5 ppb of aromatic amines, for the system based on SUPRASEC 2344 the amount of aromatic amines was 12.7 ppb. Hence both systems fulfilled the legal requirements within a day after processing. This results in curing time reduction, hence in a major cost saving in the reduction of working capital and stock, when these adhesives are used to provide laminated films for use in food industry.

In an other example, as shown in table 6, Suprasec 2344 was reacted with a polyol being castor oil (isocyanate index 105) for providing a polyisocyanate adhesive according to the prior art (formulation (A)), or with a polyol in presence of a trimerisation catalyst, both providing an adhesive with a softblock content in the preferred range of 20% to 70% (formulation (C)), and an other with a softblock content not within this preferred range (formulation (B)).

The amount of aromatic amines (DADPM) release was determined identically as set out above.

TABLE 6

| Formulation components | % softblock | DADPM immediately after cure | DADPM after 10 days |
|---|---|---|---|
| (A) S2344 + castor oil | 58 | 204 | 27 |
| (B) S2344 + Daltolac R251/Daltocel F 526 (ratio iso/polyol 1/1) + trimerisation cat. | 74 | 160 | 22 |
| (C) S2344 + Daltolac R251/Daltocel F 526 (ratio iso/polyol 4/1) + trimerisation cat. | 58 | 13 | 5 |

Also this example shows that the provision of a polyisocyanate-based adhesive comprising a trimerisation catalyst (thus providing a polyisocyanurate-based adhesive), with a softblock content in the preferred range of 20% to 70%, more preferred within the range of 40% to 60%, cause the aromatic amine release to be reduced significantly.

Again, the use of these adhesives result in curing time reduction, hence in a major cost saving in the reduction of working capital and stock, when these adhesives are used to provide laminated films for use in food industry.

The invention claimed is:

1. A polyisocyanate based adhesive obtained by reacting, in the presence of a trimerisation catalyst, (i) a polymeric polyisocyanate or a prepolymeric polyisocyanate having an isocyanate content of 6 to 30 wt. % with (ii) a polyol selected from a polyether polyol, a polyester polyol and a combination thereof; wherein component (i) is the reaction product of an organic polyisocyanate and a compound containing isocyanate-reactive hydrogen atoms selected from a monohydric alcohol, polypropylene glycol, tetramethylene glycol, polytetramethylene glycol, polyhexamethylene glycol, polyheptamethylene glycol, polydecamethylene glycol, 1,6-hexanediol, 3-methyl-1,5-pentanediol, 1,9-nonane diol, 2-methyl-1,8-octanediol, a polyester polyol, a mercaptan, a carboxylic acid, an amine, urea, an amide and a mixture thereof; wherein the trimerisation catalyst is selected from the group consisting of alkali metal salts of carboxylic acids; wherein the adhesive has a softblock content between 40 and 60 wt %; and wherein component (ii) does not comprise an amine compound and wherein component (i) and component (ii) are miscible with each other.

2. The adhesive according to claim 1, wherein at least 50% of the softblock content is provided by the compound containing isocyanate-reactive hydrogen atoms present in the adhesive.

3. The adhesive according to claim 1, wherein the trimerisation catalyst is used in an amount of 0.01 to 1% by weight based on the total formulation.

4. A laminated structure comprising a support structure, a second substrate layer and an adhesive binding the supporting layer to the second substrate layer wherein the adhesive layer comprises an adhesive as defined in claim 1.

5. A laminated structure according to claim 4, wherein the supporting structure is a film.

6. A reaction mixture for preparing a polyisocyanate based adhesive, the reaction mixture consisting of a trimerisation catalyst and (i) a polymeric polyisocyanate or a prepolymeric polyisocyanate having an isocyanate content of 6 to 30 wt. % and (ii) a polyol selected from the group consisting of polyester polyols, polyether polyols, and combinations thereof; wherein component (i) is the reaction product of an organic polyisocyanate and a compound containing isocyanate-reactive hydrogen atoms selected from a monohydric alcohol, polypropylene glycol, tetramethylene glycol, polytetramethylene glycol, polyhexamethylene glycol, polyheptamethylene glycol, polydecamethylene glycol, 1,6-hexanediol, 3-methyl-1,5-pentanediol, 1,9-nonane diol, 2-methyl-1,8-octanediol, a polyester polyol, a mercaptan, a carboxylic acid, an amine, urea, an amide and a mixture thereof; wherein the trimerisation catalyst is selected from the group consisting of alkali metal salts of carboxylic acids; wherein the adhesive has a softblock content between 40 and 60 wt %; wherein component (ii) does not comprise an amine compound; and wherein component (i) and component (ii) are miscible with each other and do not separate into two or more phases.

7. The reaction mixture according to claim 6, wherein at least 50% of the softblock content is provided by the compound containing isocyanate-reactive hydrogen atoms present in the adhesive.

* * * * *